United States Patent [19]
Miyazaki

[11] Patent Number: 5,642,020
[45] Date of Patent: Jun. 24, 1997

[54] ELECTRIC VEHICLE CONTROL DEVICE

[75] Inventor: Akira Miyazaki, Tokyo, Japan

[73] Assignee: Kabushiki Kaisha Toshiba, Kawasaki, Japan

[21] Appl. No.: 330,081

[22] Filed: Oct. 26, 1994

[30] Foreign Application Priority Data

Oct. 28, 1993 [JP] Japan .................................. 5-270500

[51] Int. Cl.$^6$ ...................................................... B60L 11/08
[52] U.S. Cl. ........................... 318/41; 318/62; 290/40 D
[58] Field of Search .......................... 318/41–62, 85, 318/91, 101; 290/40 C, 40 D, 40 E

[56] References Cited

U.S. PATENT DOCUMENTS

| | | | |
|---|---|---|---|
| 1,985,639 | 12/1934 | King, Jr. ................................. | 172/239 |
| 1,985,641 | 12/1934 | Krapf et al. ............................ | 171/313 |
| 3,707,659 | 12/1972 | Appelo ................................... | 318/52 |
| 3,736,480 | 5/1973 | Lee ......................................... | 318/51 |
| 4,054,817 | 10/1977 | Gurwicz et al. ........................ | 318/82 |
| 4,076,492 | 2/1978 | Alms et al. ............................. | 432/43 |
| 4,625,156 | 11/1986 | Komiya et al. ......................... | 318/85 |
| 4,641,069 | 2/1987 | Fujioka et al. ......................... | 318/625 |
| 4,780,650 | 10/1988 | Miyazaki et al. ...................... | 318/71 |
| 4,853,553 | 8/1989 | Hosie ...................................... | 290/40 C |
| 5,422,550 | 6/1995 | McClanahan et al. ................. | 318/91 |

OTHER PUBLICATIONS

Meyer et al., "A Hysteresis Current Control For Parallel Connected Line–Side Converters of an Inverter Locomotive", *The European Power Electronics Association*, vol. 4:102–109, (1993).

Patent Abstract of Japan, Miyazaki Rei et al., "Power Converter", Japanese No. 22 31 364, vol. 14, No. 560, Sep. 26, 1990.

Patent Abstract of Japan, Susumu Tadakuma, "Pulse Width Modulation Converter", Japanese No. 60–128870, vol. 9, No. 288, Jul. 9, 1985.

*Primary Examiner*—Brian Sircus
*Attorney, Agent, or Firm*—Foley & Lardner

[57] ABSTRACT

An electric vehicle control device for a plurality of vehicles connected in series to form a formation including a plurality of control devices, each being provided for one of the vehicles, respectively. Each of the control devices includes a PWM converter device for receiving a first A.C. power through a current collector and a transformer from an A.C. overhead line and for converting the first A.C. power into a D.C. power using a PWM carrier wave, an inverter connected to D.C. output terminals of the PWM converter device for converting the D.C. power into a second A.C. power, and an electric motor connected to A.C. output terminals of the inverter for being driven by the second A.C. power. Phase angles of the PWM carrier waves in the PWM converter devices are determined to be mutually shifted by a predetermined angle, thereby higher harmonics of the PWM carrier waves leaking into the A.C. overhead line are reduced.

6 Claims, 11 Drawing Sheets

ELECTRIC VEHICLE CONTROL DEVICE

BACKGROUND OF THE INVENTION

1. Field of the Invention

This invention relates to an electric vehicle control device, and more particularly to an electric vehicle control device wherein electric motors are driven by PWM converters and inverters.

2. Description of the Related Art

FIG. 5 shows one example of a layout of a conventional electric vehicle control device. In FIG. 5, A.C. power is obtained from an overhead line and is converted by a converter device into D.C. power, which is supplied as drive power to an electric vehicle, and also is supplied to an auxiliary power source device.

This conventional electric vehicle control device consists of: a transformer MT that accepts on its primary side A.C. electric power obtained through a current collector PAN from an A.C. overhead line (not shown), and steps down to voltage of this A.C. power; a rectifier RF that rectifies the secondary output of transformer MT; and a motor control device MCTR and an auxiliary power source device APS connected in parallel with the output side of rectifier RF. Motor control device MCTR controls a motor MM in accordance with a motoring operation command signal p from a motoring operation command circuit MC or in accordance with a brake command signal b from a brake command circuit BS. Auxiliary power source device APS generates drive power of a load LD such as in-carriage air conditioners, illumination devices, and equipment cooling fans etc.

In recent years, electric vehicle control devices have come to be used in which a voltage source pulse width modulation converter (hereinbelow called a PWM converter device) is employed in the portion corresponding to rectifier RF, and a VVVF (variable voltage variable frequency) inverter is employed in the portion corresponding to motor control device MCTR. One example of such electric vehicle control devices has been described in Japanese Patent Disclosure (Kokai) No. Heisei 4-340302 published on Nov. 26, 1992.

However, conventional electric vehicle control devices were subject to the problem that the higher harmonics produced by the switching in the voltage source PWM converter device leaked out into the current of the A.C. overhead line, with considerable adverse effects on the signalling equipments and communications system.

When the effects of such higher harmonics are further considered which is produced by conventional electric vehicle control devices, wherein power is fed from the voltage source PWM converter device to the auxiliary power source device. It suffices to feed power to the vehicle drive motor through the VVVF inverter only during motoring operation or braking operation. However, the auxiliary power source device needs to be fed power uninterruptedly, including during periods of coasting operation. It is therefore necessary to take into consideration the effects of higher harmonics not just during motoring operation and braking operation but also during coasting operation.

SUMMARY OF THE INVENTION

Accordingly, one object of this invention is to provide an electric vehicle control device wherein the effect of the higher harmonics produces by switching of the voltage source PWM converter device can be reduced to a minimum during motoring operation or braking operation.

Another object of this invention is to provide an electric vehicle control device wherein the effect of the higher harmonics produced by switching of the voltage source PWM converter device can be reduced to a minimum whether during motoring or braking operation or during coasting operation.

These and other objects of this invention can be achieved by providing an electric vehicle control device for a plurality of vehicles connected in series to form a formation including a plurality of control devices, each being provided for one of the vehicles, respectively. Each of the control devices includes a PWM converter device for receiving a first A.C. power through a current collector and a transformer from an A.C. overhead line and for converting the first A.C. power into a D.C. power using a PWM carrier wave, an inverter connected to D.C. output terminals of the PWM converter device for converting the D.C. power into a second A.C. power, and an electric motor connected to A.C. output terminals of the inverter for being driven by the second A.C. power. Phase angles of the PWM carrier waves in the PWM converter devices are determined to be mutually shifted by a predetermined angle, thereby higher harmonics of the PWM carrier waves leaking into the A.C. overhead line are reduced.

According to another aspect of this invention, there is provided an electric vehicle control device for a first plurality of first vehicles and a second plurality of second vehicles connected in series to form a formation, including a first plurality of first control devices, each being provided for one of the first vehicles, respectively, and a second plurality of second control devices, each being provided for one of the second vehicles, respectively. Each of the first control devices and said second control devices includes a PWM converter device for receiving a first A.C. power through a current collector and a transformer from an A.C. overhead line and for coverting the first A.C. power into a D.C. power using a PWM carrier wave, an inverter connected to D.C. output terminals of the PWM converter device for converting the D.C. power into a second A.C. power, and an electric motor connected to A.C. output terminals of the inverter for being driven by the second A.C. power. Each of the second control devices further includes an auxiliary power source device connected to the D.C. output terminals of the PWM converter device to receive the D.C. power for supplying power to a load. The PWM converter device in the first control device is actuated only under motoring condition or braking condition. The PWM converter device in the second control device is constantly actuated. Phase angles of the PWM carrier waves in the PWM converter devices in the first control devices are determined to be mutually shifted by a first predetermined angle under motoring condition or braking condition. Phase angles of the PWM carrier waves in the PWM converter devices in the second control devices are determined to be mutually shifted by a second predetermined angle constantly, thereby higher harmonics of the PWM carrier waves leaking into the A.C. overhead line are reduced.

According to still another aspect of this invention there is provided an electric vehicle control device for a first plurality of first vehicles and a second plurality of second vehicles connected in series to form a formation, including a first plurality of first control devices, each being provided for one of the first vehicles, respectively, and a second plurality of second control devices, each being provided for one of the second vehicles, respectively. Each of the first control devices and the second control devices includes a PWM converter device for receiving a first A.C. power through a current collector and a transformer from an A.C. overhead line and for converting the first A.C. power into a D.C. power using a PWM carrier wave, an inverter connected to D.C. output terminals of the PWM converter device for converting the D.C. power into a second A.C. power, and an electric motor connected to A.C. output terminals of the inverter for being driven by the second A.C. power. Each of the second control devices further includes an auxiliary power source device connected to the D.C. output terminals of the PWM converter device to receive the D.C. power for supplying power to a load. The PWM converter device in the first control device is actuated only under motoring condition or braking condition. The PWM converter device in the second control device is constantly actuated. Phase angles of the PWM carrier waves in all of the PWM converter devices are determined to be mutually shifted by a first predetermined angle under motoring condition or braking condition. Phase angles of the PWM carrier waves in the PWM converter devices in the second control devices are determined to be mutually shifted by a second predetermined angle under coasting condition, thereby higher harmonics of the PWM carrier waves leaking into the A.C. overhead line are reduced.

With an electric vehicle control device according to this invention, leakage of higher harmonics of the PWM controlled carrier waves of the PWM converter devices to the A.C. overhead line current can be reduced to a minimum by setting the phase angles of the respective PWM controlled carrier waves of the PWM converter devices to phase angles such that the higher harmonics of the PWM controlled carrier waves present in the A.C. overhead line current are a minimum.

With an electric vehicle control device according to this invention, leakage of higher harmonics of the PWM controlled carrier waves of the converter devices to the A.C. overhead line current can be reduced to a minimum by, under motoring operation or braking operation of the electric vehicles, setting the phase angles of the respective PWM controlled carrier waves of all the PWM converter devices, or under coasting operation of the electric vehicles, setting the phase angles of the respective PWM controlled carrier waves of the PWM converter devices connected to the auxiliary power source devices, to phase angles such that the higher harmonics of the PWM controlled carrier waves present in the A.C. overhead line current are a minimum, both when current is fed to the electric vehicle motors under motoring or braking operation and when current is fed only to the auxiliary power source devices under coasting operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
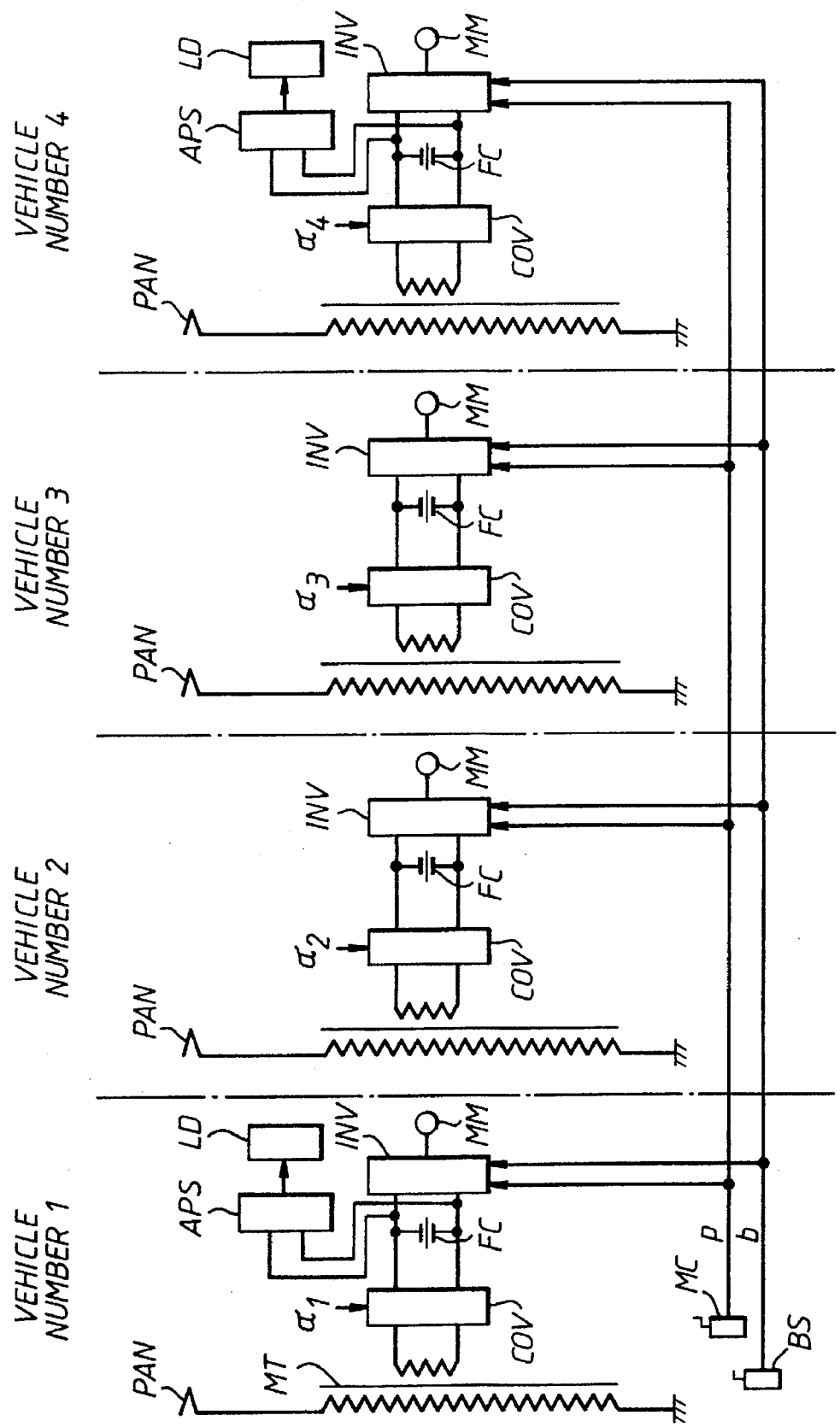
FIG. 1 is a block diagram showing an electric vehicle control device according to an embodiment of this invention.

Referring now to the drawings, wherein like reference numerals designate identical or corresponding parts throughout the several views, the embodiments of this invention will be described below.

FIG. 1 shows the system layout of an electric vehicle control device according to an embodiment of this invention. For convenience in explanation, this embodiment is illustrated in which four vehicles, vehicle number 1 to vehicle number 4, constitute a single formation.

Each vehicle is equipped with: current collector PAN for collecting A.C. power from an A.C. overhead line (not shown); transformer MT for stepping down the voltage of the A.C. power collected by current collector PAN; a voltage source PWM converter device COV provided on the secondary side of transformer MT for converting A.C. input power to D.C. power by the gate switching control performed under the control of respective gate control signals $\alpha 1$–$\alpha 4$; a filter capacitor FC and a VVVF inverter INV connected to the output side of voltage source PWM converter device COV; and electric motor MM driven by VVVF inverter INV. Additionally, in the first and fourth vehicle, auxiliary power source device APS is connected on the output side of voltage source PWM converter device COV. Each of auxiliary power source devices APS supplies power to respective loads LD consisting of the in-carriage illumination devices, air conditioners and equipment cooling fans etc.

Motoring operation command signal p from motoring operation command circuit MC and braking operation command signal b from braking command circuit BS are simultaneously input to inverters INV of all the vehicles.

Figure 2:
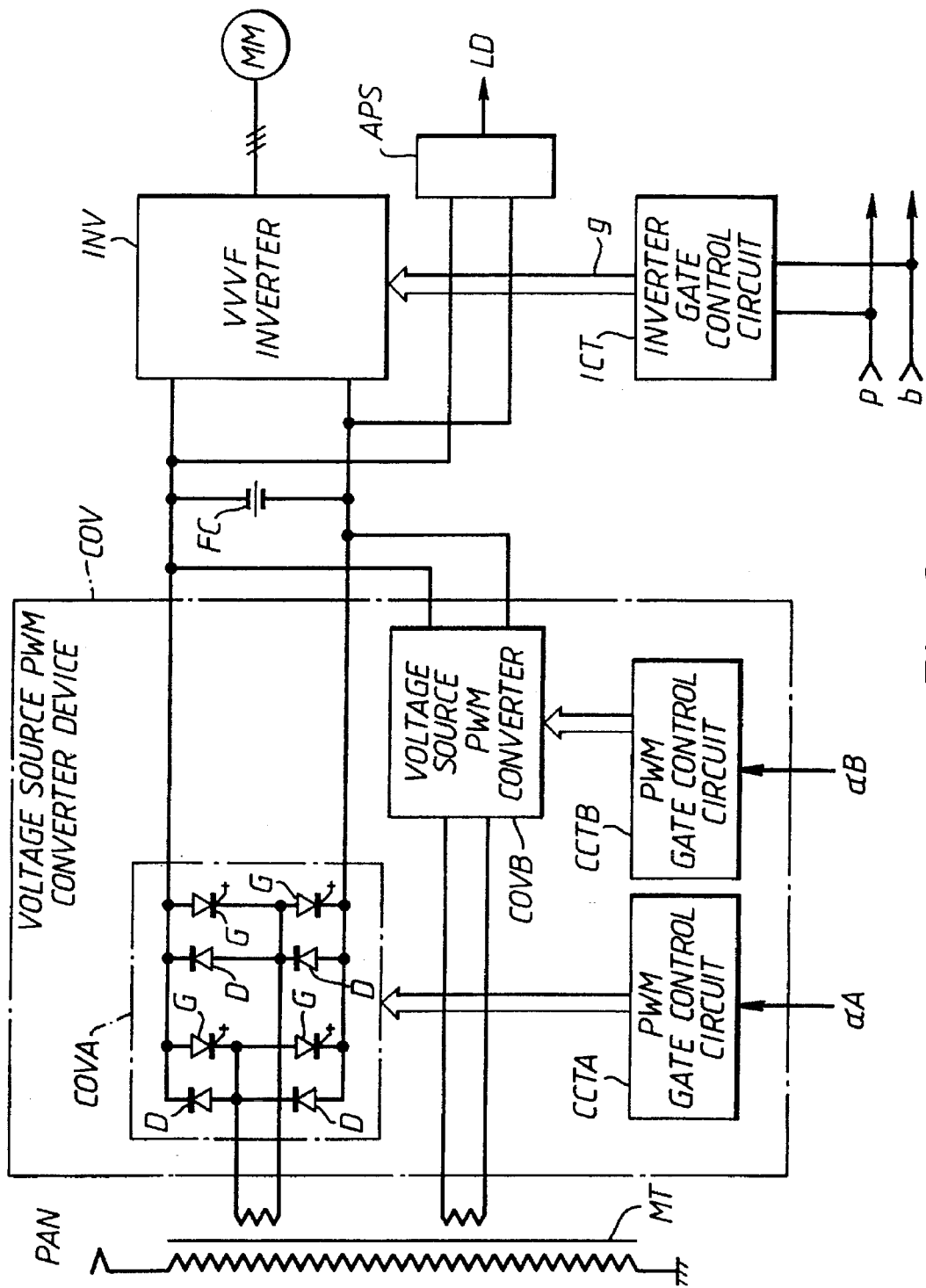
FIG. 2 is a detailed block diagram showing the electric vehicle control device of FIG. 1.

FIG. 2 shows the detailed layout of the electric vehicle control device of this embodiment and shows that of the vehicle number 1 as an example. Each voltage source PWM converter device COV is composed of two voltage source PWM converters COVA and COVB that are arranged parallel to the secondary side of transformer MT. Each of voltage source PWM converters is composed of a single phase bridge circuit of diodes D and GTO thyristors G, and are respectively subjected to gate control by PWM gate control circuits CCTA and CCTB. Each of PWM gate control circuits CCTA and CCTB is provided with a PWM carrier wave generator (not shown). The PWM carrier wave phase angles $\alpha A$ and $\alpha B$ are respectively set to PWM carrier waves of PWM gate control circuits CCTA and CCTB.

PWM carrier wave phase angles $\alpha A$, $\alpha B$ are mutually shifted in phase angle by 90° in each of PWM converter devices COV. Since the number N of converters per vehicle is N=2 and the number M of vehicles in a formation is M=4, the phase angles for each vehicle are mutually shifted by:

$$180°/(2×4)=22.5°$$

That is:

TABLE 1

| Vehicle (vehicle number) | 1 | 2 | 3 | 4 |
|---|---|---|---|---|
| αA | 0° | 22.5° | 45.0° | 67.5° |
| αB | 90.0° | 112.5° | 135.0° | 157.5° |

Furthermore, in this layout, filter capacitor FC and VVVF inverter INV are connected in parallel with the output side of voltage source PWM converter device COV. Also, in vehicle number 1 and vehicle number 4, auxiliary power source device APS is connected in parallel with filter capacitor FC. VVVF inverter INV is further subjected to gate switching control by an inverter gate control circuit ICT. Each of VVVF inverters INV in all vehicles is actuated on input of power operation command signal p or braking operation command signal b.

Next, the operation of the electric vehicle control device of the above construction will be described. As shown in FIG. 1, A.C. power collected by current collector PAN from the A.C. overhead line is stepped down in voltage by transformer MT and is input to voltage source PWM converter device COV. Voltage source PWM converter device COV continually converts this A.C. power into D.C. power and outputs it. This D.C. power is then smoothed by filter capacitor FC before being supplied to VVVF inverter INV in all vehicles and auxiliary power source device APS in vehicle number 1 and vehicle number 4.

VVVF inverter INV is actuated when motoring operation command signal p from motoring operation command circuit MC or braking operation command signal b from braking operation command circuit BS is input. VVVF inverter INV operates to reconvert the D.C. power from converter device COV into VVVF A.C. power, and then outputs it to motor MM to drive the vehicle or to apply regenerative braking to the vehicle.

Auxiliary power source devices APS in the first and fourth vehicles are continually supplied with D.C. power from PWM converter devices COV and constantly feed power to loads LD, respectively.

The operation of the voltage source PWM converter device COV of each vehicle in this case will now be described in more detail. As shown in FIG. 2, converters COVA, COVB constituting PWM converter device COV are each continually supplied with A.C. power by transformer MT. Converters COVA, COVB convert this A.C. power into D.C. power by switching action controlled by respective gate control circuits CCTA, CCTB and output this D.C. power to filter capacitor FC. The timing of this switching is determined by pulse width modulation control based on PWM carrier waves. As shown in Table 1, the phase angles of the carrier waves are shifted by 22.5° between each vehicle. Further, there is a shift of 90° between PWM carrier wave phase angles αA and αB in each vehicle. Thus PWM control is performed in the total of eight converters COVA, COVB by the PWM carrier waves which are mutually shifted in phase by 22.5°.

Figure 8:
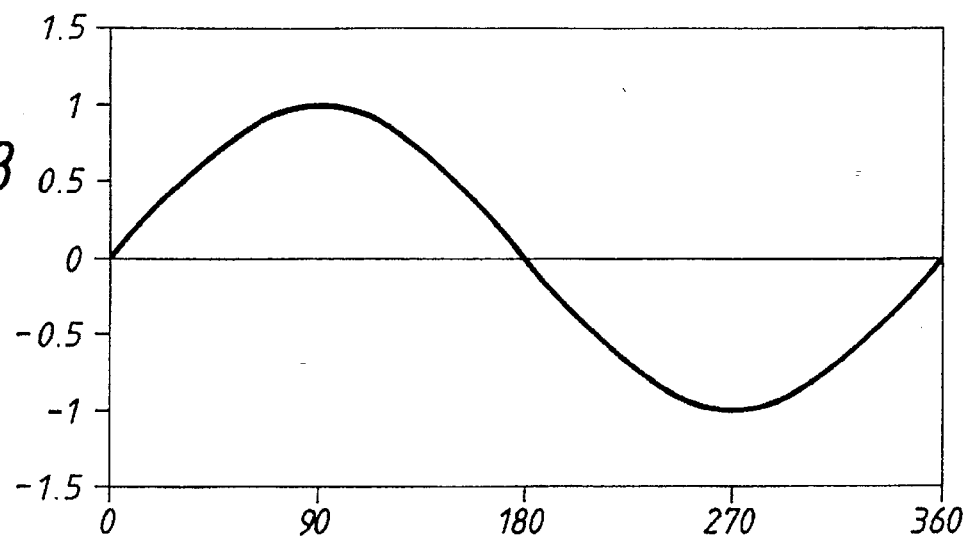
FIG. 8 is a waveform chart showing current waveforms of the converters in an embodiment.
Figure 8:
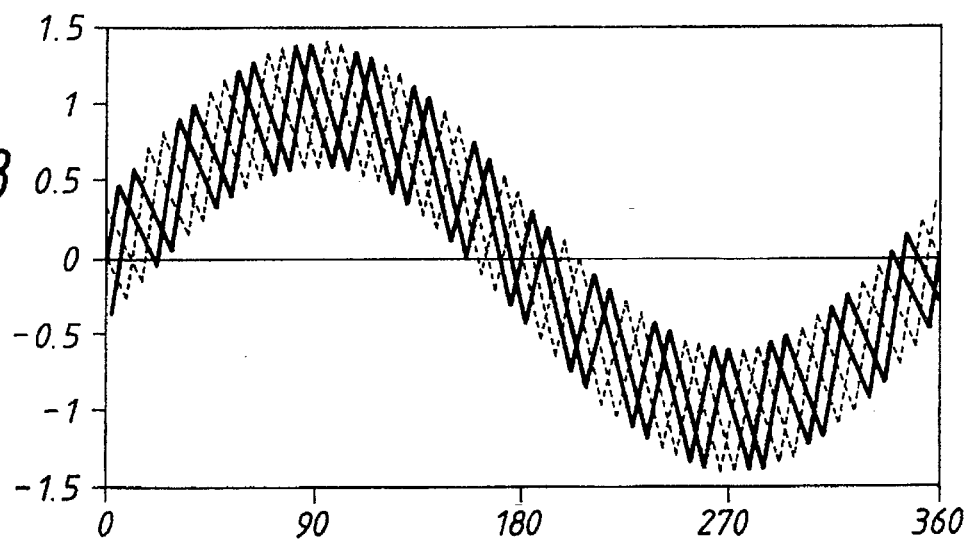

The current waveforms of eight converters COVA, COVB during the PWM control operation are shown in FIGS. 6(a)–6(d) and 7(a)–7(d). In FIGS. 6(a)–(d) show the current waveforms of four converters COVA, wherein PWM carrier wave phase angles αA=0°, 22.5°, 45.0° and 07.5°, respectively. In FIGS. 7(a)–(d) show the current waveforms of four converters COVB, wherein PWM carrier wave phase angles αB=90°, 112.5°, 135.0° and 157.7°, respectively. Next, FIG. 8(b) shows an overlapped waveform of the current waveforms of four converters COVA, COVB of vehicle numbers 1 and 3, wherein PWM carrier wave phase angles αA=0°, 45.0°, and αB=90.0°, 135°, respectively. Though not shown, similarly there is also an overlapped waveform of the current waveforms of four converters COVA, COVB of vehicle numbers 2 and 4, wherein PWM carrier wave phase angles αA=22.5°, 67.5°, and αB=112.5°, 157.5°, respectively.

As an input current of the formation as a whole, composed of four vehicles, the current with the waveform shown in FIG. 8(a) is obtained based on the currents shown in FIG. 8(b) and the four currents (not shown) as described above.

Figure 9:
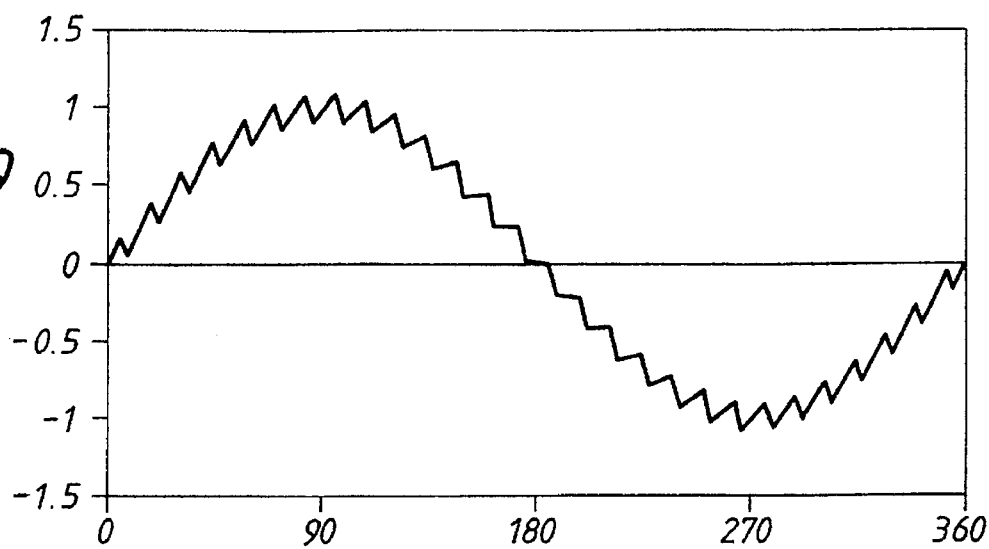
FIG. 9 is a waveform chart showing current waveforms of the converters in a prior art electric vehicle control device.
Figure 9:
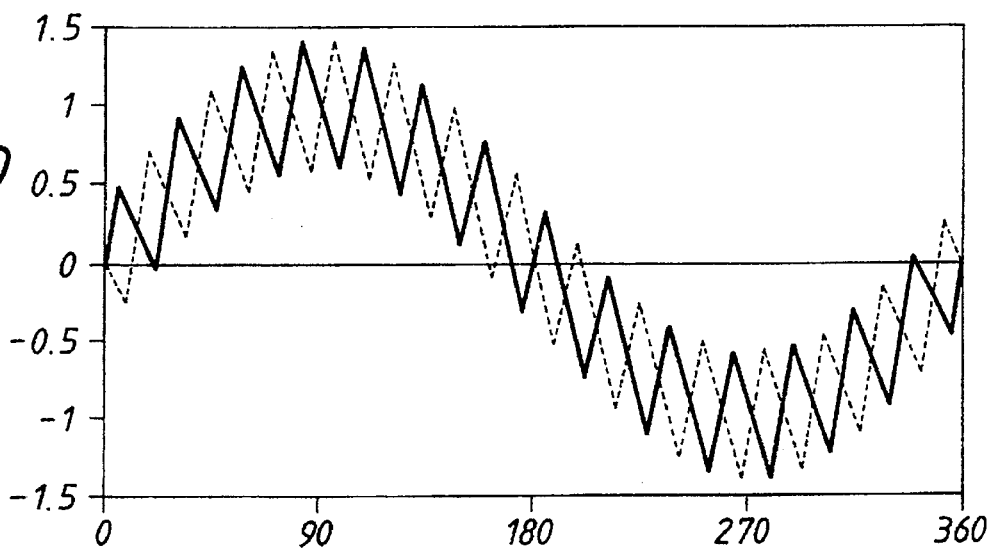

FIGS. 9(a) and 9(b) show the case where PWM carrier wave phase angles αA of four converters COVA are 0°, and PWM carrier wave phase angles αB of four converters COVB are 90°. In this case, FIG. 9(b) shows an overlapped waveform of two currents wherein PWM carrier wave phase angles αA=0°, and αB=90°. As an input current of the formation as a wohole composed of four vehicles, the current with the waveform shown in FIG. 9(a) is obtained based on the currents shown in FIG. 9(b).

As a result, regarding the higher harmonics leaking through transformer MT into the A.C. overhead line, the higher harmonics which are in the vicinity of the carrier wave frequency are mutually cancelled; thus the dominant harmonic component is shifted to a frequency that is 8 times the carrier wave frequency and the magnitude of the dominant harmonic component is reduced greatly. So the total higher harmonics are sufficiently reduced, as is clear from the comparison of the current waveforms of FIG. 8(a) and FIG. 9(a).

This invention is not limited to the embodiment described above. In the case of an electric vehicle control device wherein the number of converters per vehicle is N and the number of vehicles in a formation is M, PWM carrier wave phase angles are determined generally as follows: the phase angles in a vehicle are mutually shifted by 180°/N, and the phase angles for each vehicle are mutually shifted by 180°/(N·M).

Figure 3:
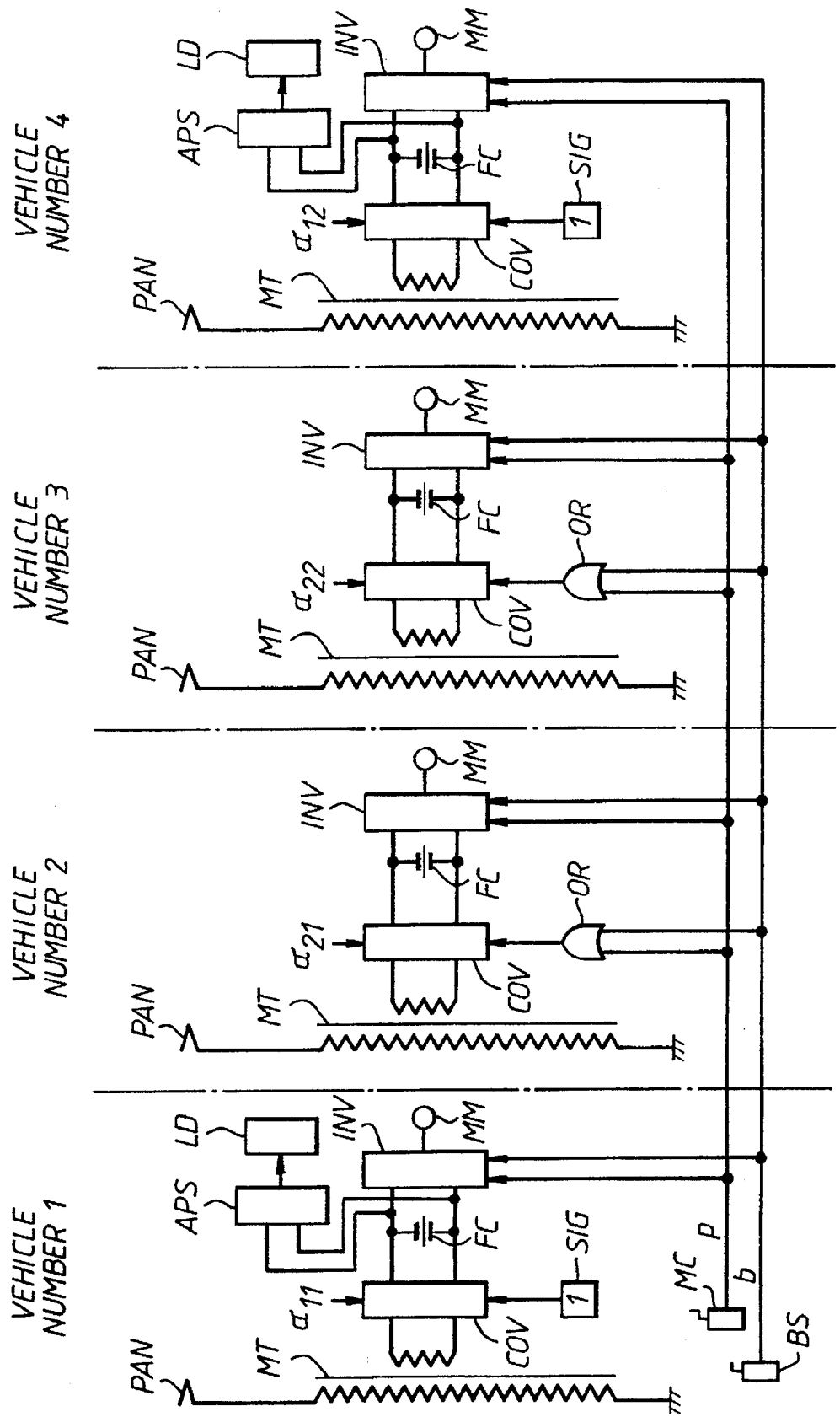
FIG. 3 is a block diagram showing an electric vehicle control device according to another embodiment of this invention.

Next, another embodiment of this invention will now be described. FIG. 3 shows the system layout of an electric vehicle control device according to another embodiment of this invention. For convenience in description, this embodiment is illustrated for the case in which a single formation is constituted by four vehicles: vehicle number 1 to vehicle number 4.

Each vehicle is equipped with: current collector PAN for collecting A.C. power from an A.C. overhead line (not shown); transformer MT for stepping down the voltage of the A.C. power collected by current collector PAN; voltage source PWM converter device COV provided on the secondary side of transformer MT wherein gate switching control is performed by respective gate control signals α11–α22 to convert the A.C. input power to D.C. power; filter capacitor FC and VVVF inverter INV connected to the output side of voltage source PWM converter device COV; and electric motor MM that is driven by VVVF inverter INV. Additionally, in the first and fourth vehicle, auxiliary power source device APS is connected on the output side of voltage source PWM converter device COV. Each of auxiliary power source devices APS supplies power to respective loads LD consisting of the in-carriage illumination devices, air conditioners and equipment cooling fans etc.

Furthermore, in this embodiment, it is designed such that only the voltage source PWM converter devices COV of the first and fourth vehicles connected to the auxiliary power source devices APS are operated during coasting operation, and during motoring operation and braking operation the voltage source PWM converter devices COV of all the vehicles are operated. This is achieved by arranging such that PWM converter devices COV of the first and fourth vehicles are connected to receive a signal SIG that provides continually drive command, whereas PWM converter devices COV of the second and third vehicles are connected to respective outputs of OR gates OR. To this OR gate motoring operation command signal p from motoring operation command circuit MC and braking operation command signal b from braking operation command circuit BS are inputted. It should be noted that motoring operation command signal p from motoring operation command circuit MC and braking operation command signal b from braking command circuit BS are both input to VVVF inverters INV of all vehicles so as to provide for actuation only under motoring operation or braking operating conditions.

Figure 4:
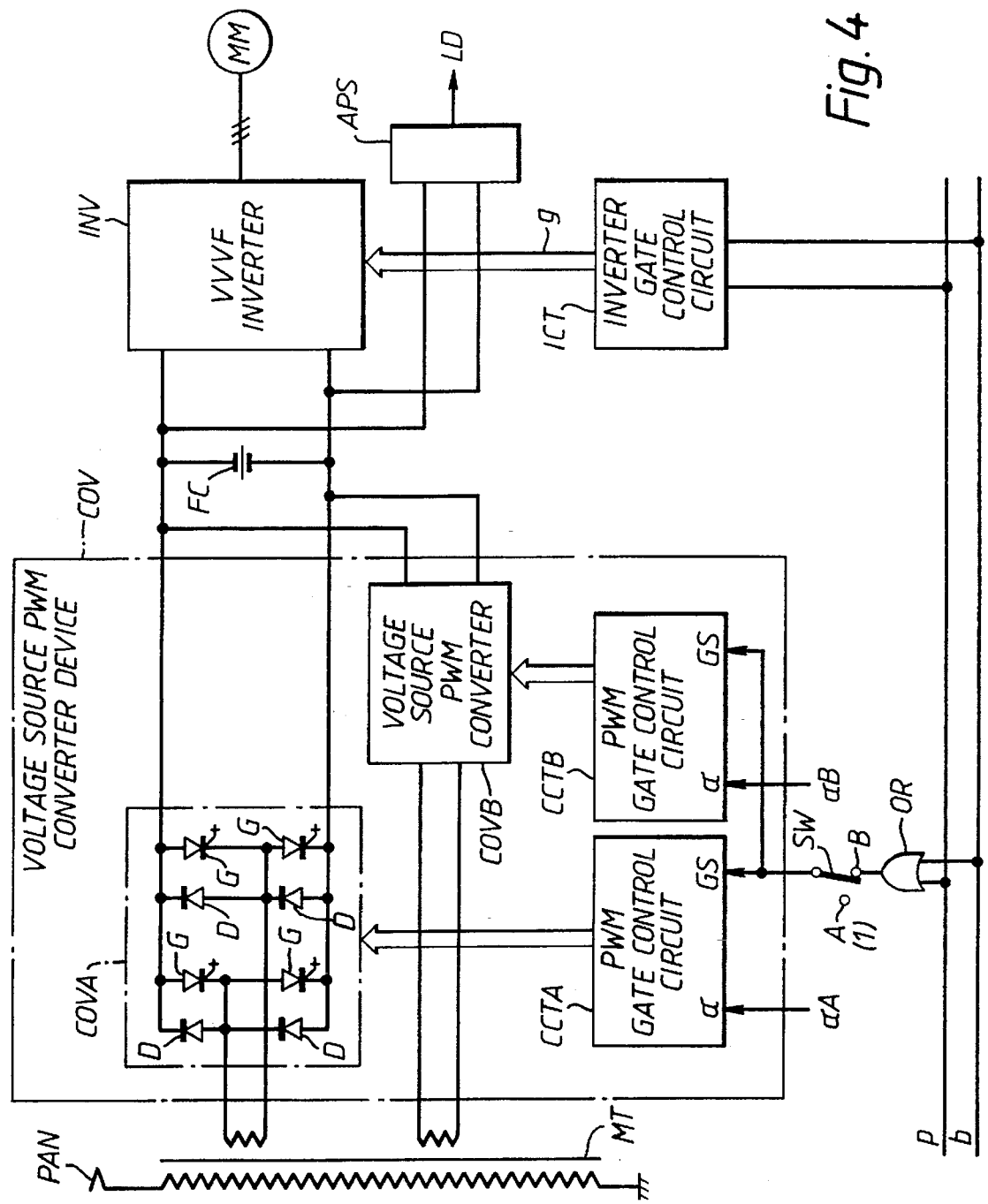
FIG. 4 is a detailed block diagram showing the electric vehicle control device of FIG. 3.
Figure 5:
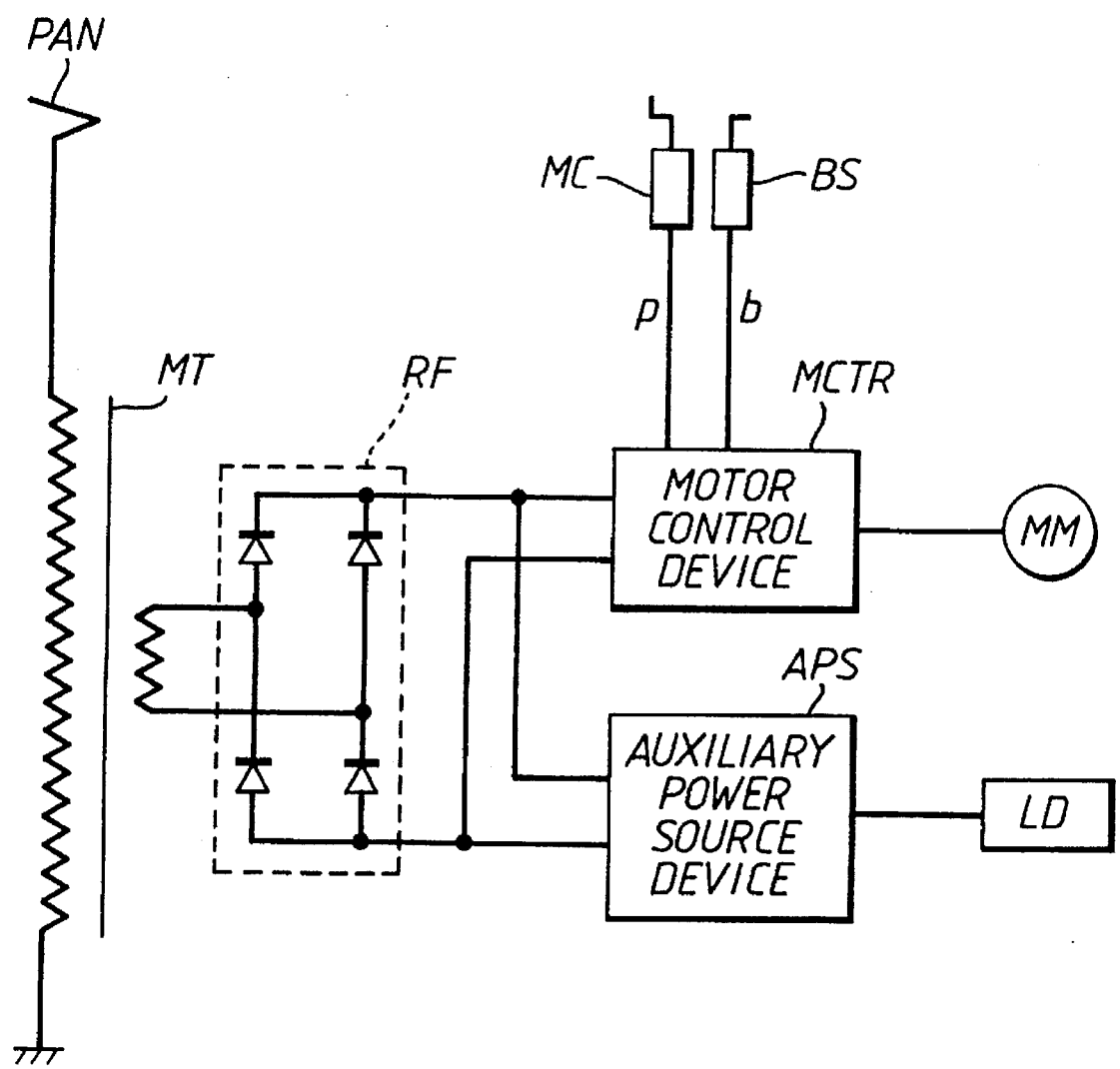
FIG. 5 is a block diagram showing an example of a conventional electric vehicle control device.
Figure 6:
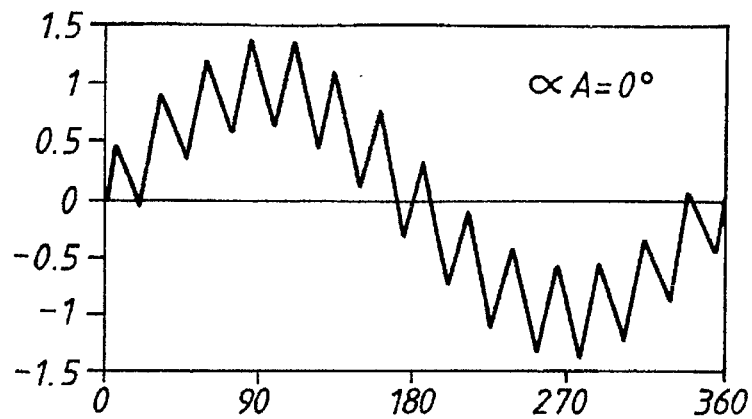
FIG. 6 is a waveform chart showing current waveforms of the converters COVA in an embodiment.
Figure 6:
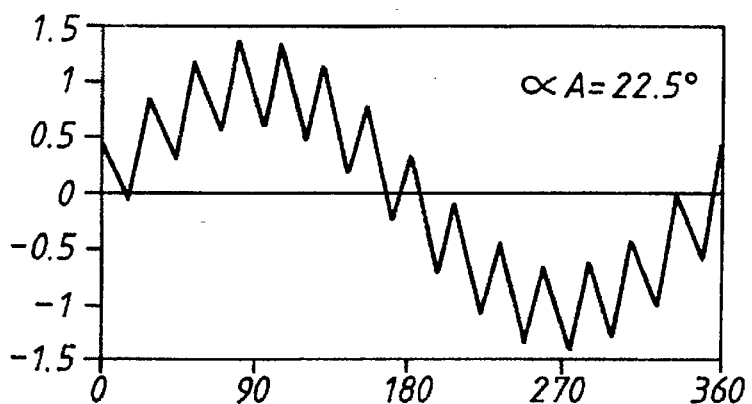
Figure 6:
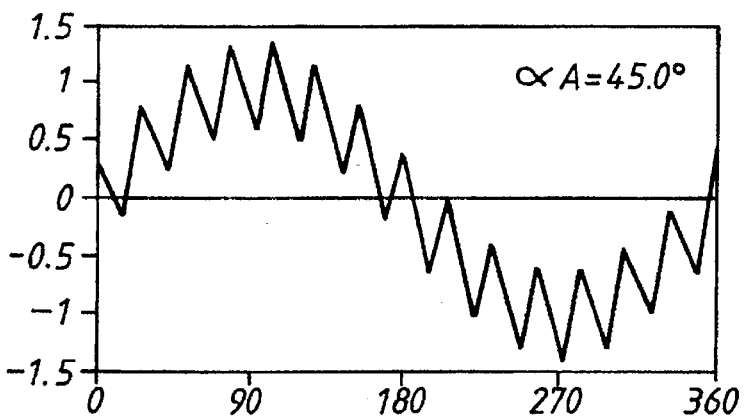
Figure 6:
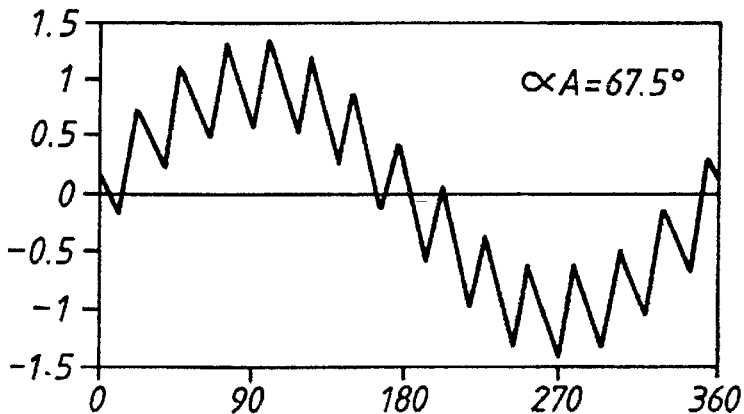
Figure 7:
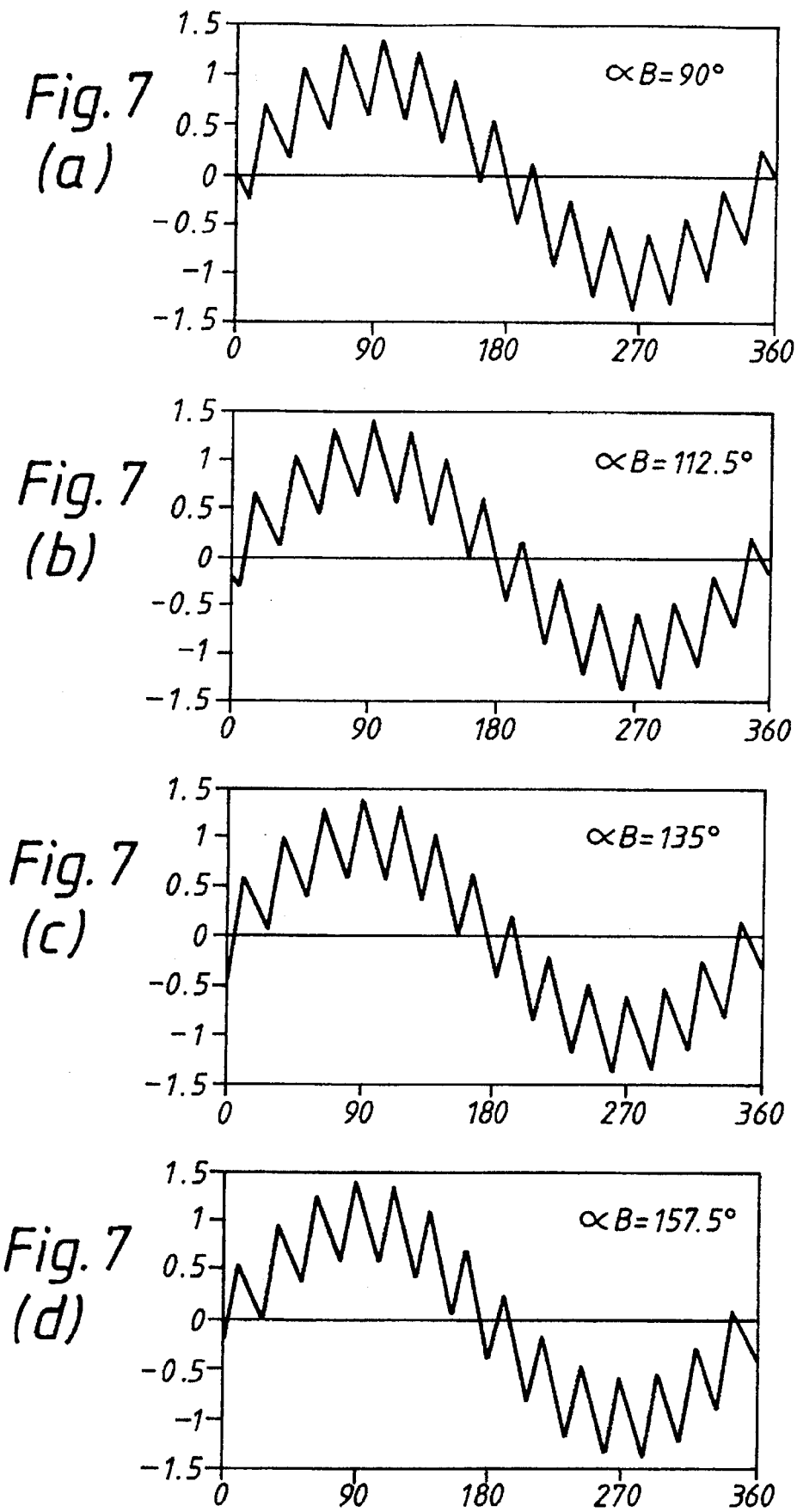
FIG. 7 is a waveform chart showing current waveforms of the converters COVB in an embodiment.

FIG. 4 shows the detailed layout of the electric vehicle control device of this embodiment. Each of voltage source PWM converter devices COV has a construction in which two voltage source PWM converters COVA, COVB, are arranged in parallel with the secondary side of transformer MT and are subject to gate switching control by PWM gate control circuits CCTA, CCTB. Each of PWM gate control circuits CCTA, CCTB is provided with a PWM carrier wave generator, and is set PWM carrier wave phase angle $\alpha A$ or $\alpha B$, respectively. Each of voltage source PWM converter devices COV is also provided with a changeover switch SW.

In the case of the first vehicle and the fourth vehicle, in which auxiliary power source device APS is connected, changeover switch SW is connected to contact A which constantly supplies an ON command "1".

In the case of the second vehicle and the third vehicle, in which auxiliary power source device APS is not connected, changeover switch SW is connected to contact B which is connected to OR output of OR gate OR that inputs motoring operation command signal p and braking operation command signal b, so as to only supply an ON command under either motoring operation or braking operation conditions.

In this embodiment, four vehicles are divided into two groups. A first group is composed of the second and third vehicles without auxiliary power source device APS. The number M1 of the vehicles of the first group is M1=2. A second group is composed of the first and fourth vehicles with auxiliary power source device APS. The number M2 of the vehicles of the second group is also M2=2.

The number N of converters per vehicle is N=2. Phase angles $\alpha A$, $\alpha B$ of the PWM carrier waves are mutually shifted in phase angle by 90° in each of PWM converter devices COV. During coasting operation, the total of 4 (=N·M2) converters COVA, COVB of the second group are simultaneously operating, so the phase angles for each vehicle are mutually shifted by $$180°/(2\times 2)=45°$$

During motoring operation and braking operation, all of eight converters COVA, COVB are operating.

Phase angles of the PWM carrier waves are determined in the same group. In the first group, the total of 4 (=N·M1) converters COVA, COVB are simultaneously operating, so the phase angles for each vehicle are mutually shifted by $$180°/(2\times 2)=45°$$

In the second group, the phase angles for each vehicle are mutually shifted by 45°, the same as during coasting operation.

Thus phase angles $\alpha A$, $\alpha B$ are determined as in Table 2.

| Vehicle (Vehicle number) | 1st group 2 | 1st group 3 | 2nd group 1 | 2nd group 4 |
| --- | --- | --- | --- | --- |
| $\mu A$ | 45.0° | 0.0° | 0° | 45.0° |
| $\alpha B$ | 135.0° | 90.0° | 90.0° | 135.0° |

Next, the operation of the electric vehicle control device of the above construction will be described. As shown in FIG. 3, A.C. power that is collected by current collector PAN from the A.C. overhead line is stepped down in voltage by transformer MT and is input to voltage source PWM converter device COV.

Each of voltage source PWM converter devices COV of the first and fourth vehicles, in which auxiliary power source device APS is connected, continually converts the A.C. power to D.C. power and delivers it as output. This output is smoothed by filter capacitor FC before being fed to inverter INV and auxiliary power source device APS. In contrast, each of voltage source PWM converter devices COV of the second and third vehicles, where no auxiliary power source device APS is connected, is only actuated during motoring operation and braking operation when the output of OR gate OR is "1", to supply power through filter capacitors FC to VVVF inverters INV.

VVVF inverter INV is actuated when motoring operation command signal p is input from motoring operation command circuit MC or braking command signal b is input from braking operation command circuit BS. VVVF inverter INV operates to reconvert the D.C. power from converter device COV into VVVF A.C. power, and then outputs it to motors MM so as to drive the vehicle or to apply regenerative braking to the vehicle.

Voltage source PWM converter devices COV in the first and fourth vehicles feed power continuously to auxiliary power source devices APS, which always supply power to loads LD, respectively.

The operation of voltage source PWM converter device COV in each vehicle in this case will now be described in more detail. As shown in FIG. 4, converters COVA, COVB that constitute voltage source PWM converter device COV are respectively constantly supplied with A.C. power by transformer MT. Converters COVA, COVB convert this A.C. power into D.C. power by switching action controlled by respective gate control circuits CCTA, CCTB, and output D.C. power to filter capacitor FC. In order to determine the timing of this switching action, PWM control is performed based on a carrier wave. However, the phase angles of the carrier waves are shifted by 45° for each vehicle as shown in Table 2. Furthermore, PWM carrier wave phase angles $\alpha A$ and $\alpha B$ in each vehicle are mutually shifted by 90°. When therefore coasting operation is performed, PWM control is carried out in the total of four converters COVA, COVB of vehicle number 1 and number 4, by the PWM carrier waves mutually shifted in phase by 45°.

Figure 10:
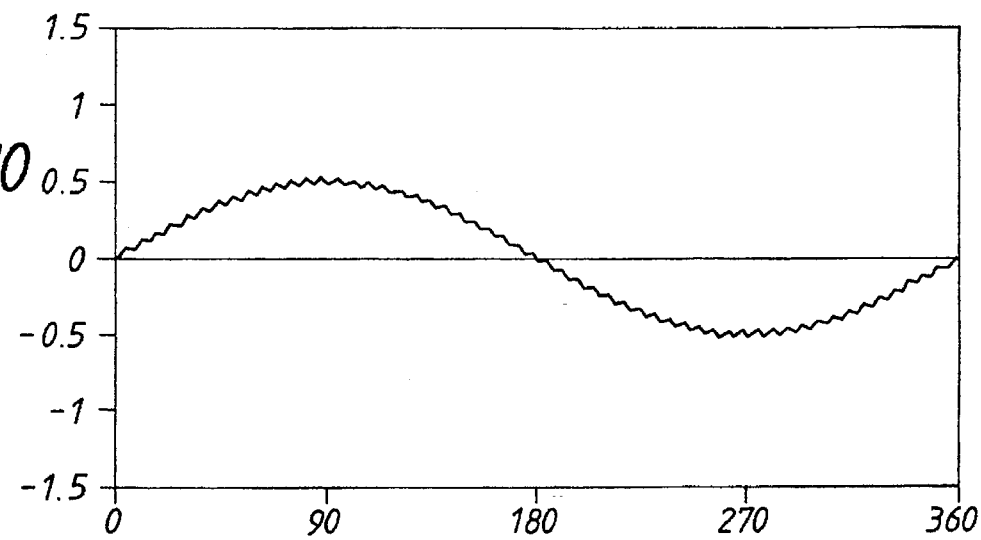
FIG. 10 is a waveform chart showing current waveforms of the converters in another embodiment.
Figure 10:
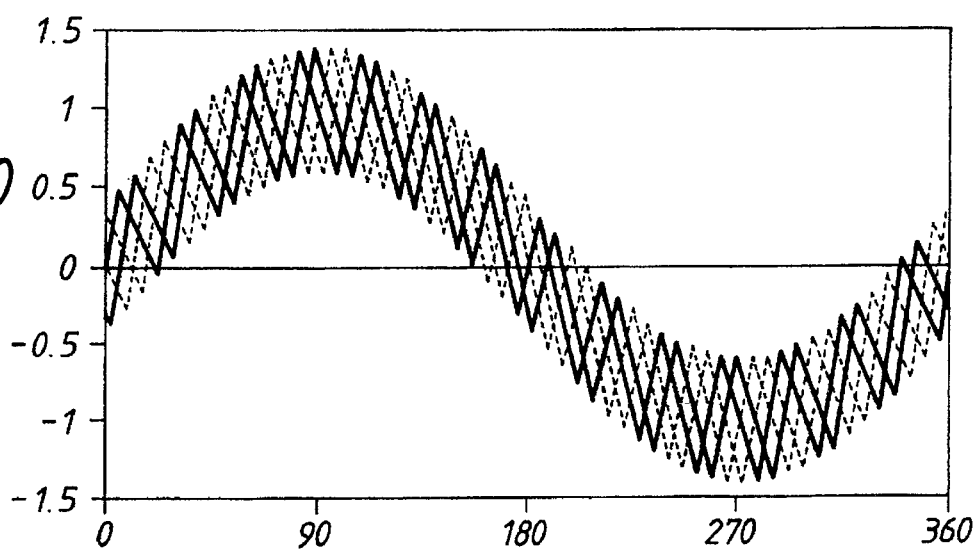

The current waveforms of four converters COVA, COVB of vehicles numbers 1 and 4 during coasting operation are shown in FIG. 10(b). In this Figure, an overlapped waveform of the currents of the four converters is shown, wherein PWM carrier wave phase angles $\alpha A=0°$, 45.0°, and $\alpha B=90°$, 135°. In this case, as an input current of the formation as a whole during coasting operation, the current with the waveform shown in FIG. 10(a) is obtained.

Figure 11:
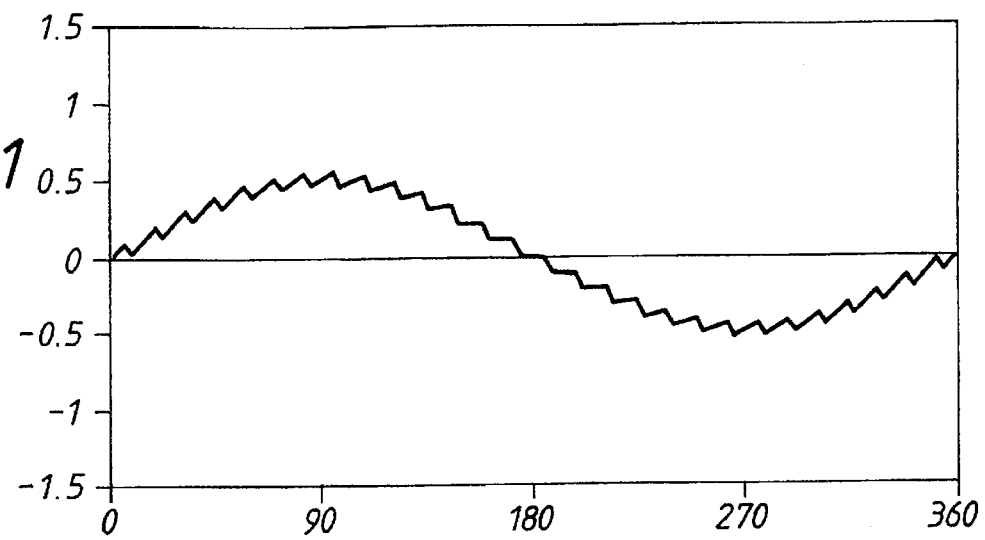
FIG. 11 is a waveform chart showing current waveforms of the converters in a prior art electric vehicle control device.
Figure 11:
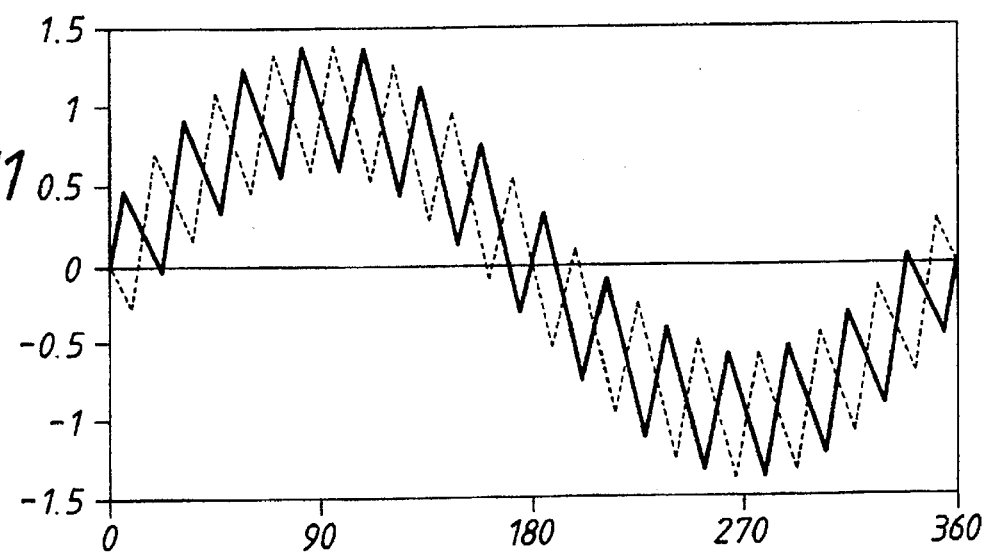

FIGS. 11(a) and 11(b) show the case where PWM carrier wave phase angles αA=0°, and αB=90° in converters COVA, COVB in vehicle numbers 1 and 4. In this case, FIG. 11(b) shows an overlapped waveform of two current waveforms, wherein PWM carrier wave phase angles αA=0° and αB=90°. As an input current of the formation as a whole during coasting operation, the current with the current waveform shown in FIG. 11(a) is obtained.

And in the case of motoring operation and braking operation, PWM control is performed on carrier waves mutually shifted in phase by 45° in the total of four converters COVA, COVB of vehicles number 1 and number 4 wherein auxiliary power source devices APS are connected. PWM control is also performed on carrier waves mutually shifted in phase by 45° in the total of four converters COVA, COVB of vehicles number 2 and number 3 wherein auxiliary power source devices APS are not connected.

As a result, the PWM carrier wave phase angles are uniformly distributed both during coasting operation and during motoring/braking operation. Higher harmonics of the carrier waves leaking into the A.C. overhead line through transformer MT which are in the vicinity of the carrier wave frequency are therefore mutually cancelled. Thus the dominant harmonic component is shifted to a frequency that is four times the carrier wave frequency and the magnitude of the dominant harmonic component is reduced greatly. So, the total higher harmonics are sufficiently reduced, as is clear, for exmple, from the comparison of the current waveforms of FIG. 10(a) and FIG. 11(a) during coasting operation.

This invention is not limited to the embodiment described above. In the case of an electric vehicle control device wherein the number of converters per vehicle is N, the number of first vehicles without auxiliary power source device APS is M1 and the number of second vehicles with auxiliary power source device APS is M2, PWM carrier wave phase angles are determined generally as follows: the phase angles in a vehicle are mutually shifted by 180°/N, the phase angles for each first vehicle are mutually shifted by 180°/(N·M1) and the phase angles for each second vehicle are mutually shifted by 180°/(N·M2).

According to still another embodiment of this invention, in the case of an electric vehicle control device with the construction as described above, PWM carrier wave phase angles may be determined as follows: the phase angles in a vehicle are mutually shifted by 180°/N, the phase angles for all vehicles are mutually shifted by 180°/(N·(M1+M2)) during motoring operation or braking operation and the phase angles for each second vehicle are mutually shifted by 180°/(N·M2) during coasting operation. In this embodiment, the total higher harmonics of the carrier waves leaking into the A.C. overhead line through transformer MT are also sufficiently reduced.

This invention is not restricted to the embodiments described above. In particular, the number of vehicles in the formation of drive vehicles carrying motors could be further increased and the shift of the carrier wave phase angles are not restricted to those described above. In fact the shift angle are not limited strictly to the values described above, it is possible to determine the shift angles experimentally so long as reduction in higher harmonics is achieved.

As described above, according to this invention, the phase angles of the respective PWM controlled carrier waves of the PWM converter devices are set to phase angles such that the higher harmonics of the PWM controlled carrier waves that get into the A.C. overhead line current are reduced to a minimum. Leakage of higher harmonics of PWM controlled carrier waves into the A.C. overhead line current can thus be reduced to a minimum.

According to this invention during motoring operation or braking operation of the vehicles, the phase angles of the respective PWM controlled carrier waves of all the PWM converter devices are set to phase angles such that higher harmonics of the PWM controlled carrier waves present in the A.C. overhead line current are a minimum, and, during coasting operation of the vehicles, the phase angles of the respective PWM controlled carrier waves of the PWM converter devices to which auxiliary power source devices are connected are set to phase angles such that higher harmonics of the PWM controlled carrier waves present in the A.C. overhead line current are a minimum, respectively. Consequently, whether during motoring and braking operation in which power is fed to the vehicle motors, or during coasting operation in which power is fed only to the auxiliary power source devices, leakage of higher harmonics of the PWM controlled carrier waves of the converter devices into the A.C. overhead line current can be reduced to a minimum.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vehicle control device for a first plurality of first vehicles and a second plurality of second vehicles connected in series to form a formation, the electric vehicle control device comprising:

a first plurality of first control devices, each being provided for one of said first plurality of said first vehicles, respectively;

a second plurality of second control devices, each being provided for one of said second plurality of said second vehicles, respectively;

each of said first control devices and said second control devices including, a PWM converter device for receiving a first A.C. power through a current collector and a transformer from an A.C. overhead line and for converting said first A.C. power into a D.C. power using a PWM carrier wave, an inverter connected to D.C. output terminals of said PWM converter device for converting said D.C. power into a second A.C. power, and an electric motor connected to A.C. output terminals of said inverter for being driven by said second A.C. power;

each of said second control devices further including an auxiliary power source device connected to said D.C. output terminals of said PWM converter device to receive said D.C. power for supplying power to a load;

said PWM converter device in said first control device being actuated only under a motoring condition or a braking condition;

said PWM converter device in said second control device being constantly actuated;

phase angles of said PWM carrier waves in said first plurality of said PWM converter devices in said first plurality of said first control devices being mutually shifted by a first predetermined angle; and phase angles of said PWM carrier waves in said second plurality of said PWM converter devices in said second plurality of said second control devices being determined to be mutually shifted by a second predetermined angle, whereby higher harmonics of said PWM carrier waves leaking into said A.C. overhead line are reduced.

2. The electric vehicle control device according to claim 1:

wherein in said first plurality of said first control devices, said first predetermined angle is $180°/M1$, where the number of said first plurality of said first vehicles is M1; and wherein in said second plurality of said second control devices, said second predetermined angle is $180°/M2$, where the number of said second plurality of said second vehicle is M2.

3. The electric vehicle control device according to claim 1:

wherein each of said PWM converter devices includes PWM converters connected in parallel with each other;

wherein said phase angles of said PWM carrier waves in said PWM converters in each of said PWM converter devices are mutually shifted by an angle of $180°/N$;

wherein in said first plurality of said first control devices, said first predetermined angle is $180°/(N \cdot M1)$;

wherein in said second plurality of said second control devices, said second predetermined angle is $180°/(N \cdot M2)$ and wherein the number of said PWM converters in each of said PWM converter devices is N, the number of said first plurality of said first vehicles is M1, and the number of said second plurality of said second vehicles is M2.

4. An electric vehicle control device for a first plurality of first vehicles and a second plurality of second vehicles connected in series to form a formation, the electric vehicle control device comprising:

a first plurality of first control devices, each being provided for one of said first plurality of said first vehicles, respectively;

a second plurality of second control devices, each being provided for one of said second plurality of said second vehicles, respectively;

each of said first control devices and said second control devices including, a PWM converter device for receiving a first A.C. power through a current collector and a transformer from an A.C. overhead line and for converting said first A.C. power into a D.C. power using a PWM carrier wave, an inverter connected to D.C. output terminals of said PWM converter device for converting said D.C. power into a second A.C. power, and an electric motor connected to A.C. output terminals of said inverter for being driven by said second A.C. power;

each of said second control devices further including an auxiliary power source device connected to said D.C. output terminals of said PWM converter device to receive said D.C. power for supplying power to a load;

said PWM converter device in said first control device being actuated only under a motoring condition or a braking condition;

said PWM converter device in said second control device being constantly actuated;

phase angles of said PWM carrier waves in all of said PWM converter devices being mutually shifted by a first predetermined angle under the motoring condition or the braking condition; and phase angles of said PWM carrier waves in said second plurality of said PWM converter devices in said second plurality of said second control devices being mutually shifted by a second predetermined angle under a coasting condition, whereby higher harmonics of said PWM carrier waves leaking into said A.C. overhead line are reduced.

5. The electric vehicle control device according to claim 4:

wherein in said first plurality of said first control devices and said second plurality of second control devices, said first predetermined angle is $180°/(M1+M2)$;

wherein in said second plurality of said second control devices, said second predetermined angle is $180°/M2$, and wherein the number of said first plurality of said first vehicles is M1 and the number of said second plurality of said second vehicles is M2.

6. The electric vehicle control device according to claim 4:

wherein each of said PWM converter devices includes PWM converters connected in parallel with each other;

wherein said phase angles of said PWM carrier waves in said PWM converters in each of said PWM converter devices are mutually shifted by an angle of $180°/N$;

wherein in said first plurality of said first control devices and said second plurality of second control devices, said first predetermined angle is $180°/(N \cdot (N1+M2))$;

wherein in said second plurality of second control devices, said second predetermined angle is $180°/(N \cdot M2)$; and wherein the number of said PWM converters in each of said PWM converter devices is N, the number of said first plurality of said first vehicles is M1, and the number of said second plurality of said second vehicles is M2.

* * * * *